US012646511B2

(12) United States Patent
Bapat et al.

(10) Patent No.: US 12,646,511 B2
(45) Date of Patent: Jun. 2, 2026

(54) METHOD AND APPARATUS FOR SUPPORTING VOICE INSTRUCTIONS

(71) Applicant: Samsung Electronics Co., Ltd., Gyeonggi-do (KR)

(72) Inventors: Sandip Shriram Bapat, Bangalore (IN); Mainak Choudhury, Banagalore (IN); Sudhansu Ranjan Acharya, Bangalore (IN); Abhishek Sharma, Bangalore (IN); Amogha D Shanbhag, Bangalore (IN); Giridhar Jakki, Bangalore (IN); G Purushothama Chowdari, Bangalore (IN); Ravibhushan B. Tayshete, Bangalore (IN); Rituraj Kabra, Bangalore (IN); Jagmeet Singh, Bangalore (IN); Nishtha Goel, Bangalore (IN)

(73) Assignee: Samsung Electronics Co., Ltd (KR)

( * ) Notice: Subject to any disclaimer, the term of this patent is extended or adjusted under 35 U.S.C. 154(b) by 1025 days.

(21) Appl. No.: 17/426,458

(22) PCT Filed: Jan. 28, 2020

(86) PCT No.: PCT/KR2020/001282
§ 371 (c)(1),
(2) Date: Jul. 28, 2021

(87) PCT Pub. No.: WO2020/159190
PCT Pub. Date: Aug. 6, 2020

(65) Prior Publication Data
US 2022/0108694 A1 Apr. 7, 2022

(30) Foreign Application Priority Data

Jan. 28, 2019 (IN) .............................. 201941003428

(51) Int. Cl.
*G06F 17/27* (2006.01)
*G06F 3/01* (2006.01)
(Continued)

(52) U.S. Cl.
CPC .............. *G10L 15/22* (2013.01); *G06F 3/017* (2013.01); *G06F 3/167* (2013.01); *G06F 40/205* (2020.01); *G10L 2015/223* (2013.01)

(58) Field of Classification Search
CPC ...... G06F 3/167; G06F 40/205; G06F 40/279; G06F 40/247; G06F 3/017; G06F 3/0488; G10L 15/22; G10L 2015/223
(Continued)

(56) References Cited

U.S. PATENT DOCUMENTS

| 8,942,985 B2 * | 1/2015 | Mowatt ................... G06F 3/167 |
| | | 704/275 |
| 9,412,358 B2 | 8/2016 | Mishra et al. |

(Continued)

FOREIGN PATENT DOCUMENTS

| KR | 10-2013-0080380 | 7/2013 | |
| KR | 2013080380 A * | 7/2013 | ............... G06F 3/01 |
| WO | WO 2018-177233 | 10/2018 | |

OTHER PUBLICATIONS

International Search Report dated May 8, 2020 issued in counterpart application No. PCT/KR2020/001282, 3 pages.
(Continued)

*Primary Examiner* — Md S Elahee
(74) *Attorney, Agent, or Firm* — The Farrell Law Firm, P.C.

(57) ABSTRACT

Provided is a method of supporting voice instructions for executing an application. The method includes obtaining a sequence for operating an application based on a user interaction, receiving a voice instruction with respect to the
(Continued)

application from a user, extracting at least one keyword included in the voice instruction, comparing the at least one keyword with pre-stored keywords in a device, and executing the application to perform an action corresponding to the voice instruction.

11 Claims, 12 Drawing Sheets

(51) Int. Cl.
  *G06F 3/16*     (2006.01)
  *G06F 40/205*    (2020.01)
  *G10L 15/22*    (2006.01)
(58) Field of Classification Search
  USPC .......................................................... 704/9
  See application file for complete search history.

(56)       References Cited

U.S. PATENT DOCUMENTS

| | | | |
|---|---|---|---|
| 9,542,928 | B2 | 1/2017 | Cao et al. |
| 2015/0294220 | A1 | 10/2015 | Oreif |
| 2017/0112446 | A1 | 4/2017 | Dagum |
| 2018/0040324 | A1 | 2/2018 | Wilberding |
| 2019/0304461 | A1 | 10/2019 | Pan |

OTHER PUBLICATIONS

Written Opinion dated May 8, 2020 issued in counterpart application No. PCT/KR2020/001282, 4 pages.

* cited by examiner

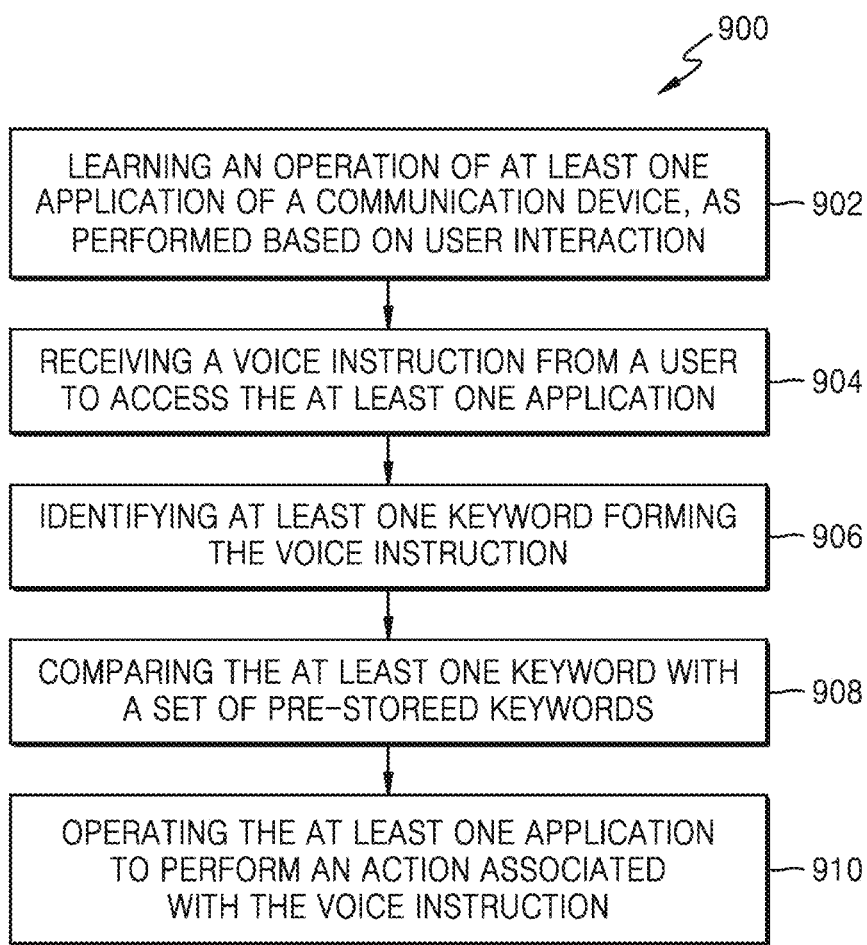

LEARNING AN OPERATION OF AT LEAST ONE APPLICATION OF A COMMUNICATION DEVICE, AS PERFORMED BASED ON USER INTERACTION — 902

RECEIVING A VOICE INSTRUCTION FROM A USER TO ACCESS THE AT LEAST ONE APPLICATION — 904

IDENTIFYING AT LEAST ONE KEYWORD FORMING THE VOICE INSTRUCTION — 906

COMPARING THE AT LEAST ONE KEYWORD WITH A SET OF PRE-STOREED KEYWORDS — 908

OPERATING THE AT LEAST ONE APPLICATION TO PERFORM AN ACTION ASSOCIATED WITH THE VOICE INSTRUCTION — 910

FIG. 9

METHOD AND APPARATUS FOR SUPPORTING VOICE INSTRUCTIONS

PRIORITY

This application is a National Phase Entry of PCT International Application No. PCT/KR2020/001282 which was filed on Jan. 28, 2020, and claims priority to Indian Patent Application No. 201941003428, which was filed on Jan. 28, 2019, the entire content of each of which is incorporated herein by reference.

TECHNICAL FIELD

The disclosure relates to voice instruction-based operation of applications, more particularly, relates to methods and apparatus for accessing at least one application of an electronic device based on voice instructions.

BACKGROUND ART

Nowadays, communication devices or electronic devices such as a smartphone, a tablet, a PC, and a laptop computer have become indispensible in our lives. In fact, with the advent of technology, a communication device has become a one-point solution for a lot of routine matters. A number of different applications are generally installed in the communication device for performing various functions. One of the popular techniques for executing an application is using voice commands or voice instructions. As generally known, a user can instruct an application to operate by using his/her voice. Based on the voice instruction or the voice command, the application accordingly performs a corresponding function. For example, the user may provide a voice instruction as "Set Alarm for 7:30 AM". As a response, an alarm-setting application installed in the communication device may set an alarm for the instructed time.

Such voice-enabled function is currently available for limited applications, mostly, for in-built applications of the communication device. Therefore, most of the third-party applications do not have the capability of responding to voice instructions. Further, even for the in-built applications, voice instructions are predetermined to operate only a specific application for performing a specific task. For example, only the voice instructions that are enabled in the communication device by a device manufacturer or an application developer may be supported. Therefore, the user can use only the predefined voice instructions to operate the applications.

Further, any variation of utterance of the voice instructions is generally not recognized by the communication device. In other words, the user may have to utter an exact predefined voice instruction to control an application to operate in a specified manner. Generally, only the variations as defined by authorized application developers and device manufacturers are supported by the applications. Therefore, the user may get easily frustrated while attempting to operate the application based on voice instructions, as the user may not always be able to remember the exact voice instruction.

In existing Natural Language Understanding (NLU) techniques, application developers or language experts train a system by anticipating speaking variations of users. This basically involves handling a large amount of training data which is cumbersome as well as an expensive affair.

DISCLOSURE OF INVENTION

Solution to Problem

The disclosure proposes a method and an apparatus which enables an electronic device to execute, with a voice instruction, an application which is not responsive to a voice instruction by training the electronic device to store a sequence of operations corresponding to a voice instruction by the user input on the electronic device.

The disclosure has been made to address at least the disadvantages described above and to provide at least the advantages described below.

Provided is a method of supporting voice instructions for executing an application. The method includes obtaining a sequence for operating an application based on a user interaction, receiving a voice instruction with respect to the application from a user, extracting at least one keyword included in the voice instruction, comparing the at least one keyword with pre-stored keywords in a device, and executing the application to perform an action corresponding to the voice instruction.

Advantageous Effects of Invention

The disclosure proposes a method and an apparatus which enables an electronic device to execute, with a voice instruction, an application which is not responsive to a voice instruction by training the electronic device.

BRIEF DESCRIPTION OF DRAWINGS

These and other features, aspects, and advantages of the present invention will become better understood when the following detailed description is read with reference to the accompanying drawings in which like characters represent like parts throughout the drawings, wherein:

FIG. 9 is a flow diagram illustrating a method of accessing at least one application of the communication device, according to an embodiment of the disclosure;

Figure 1:
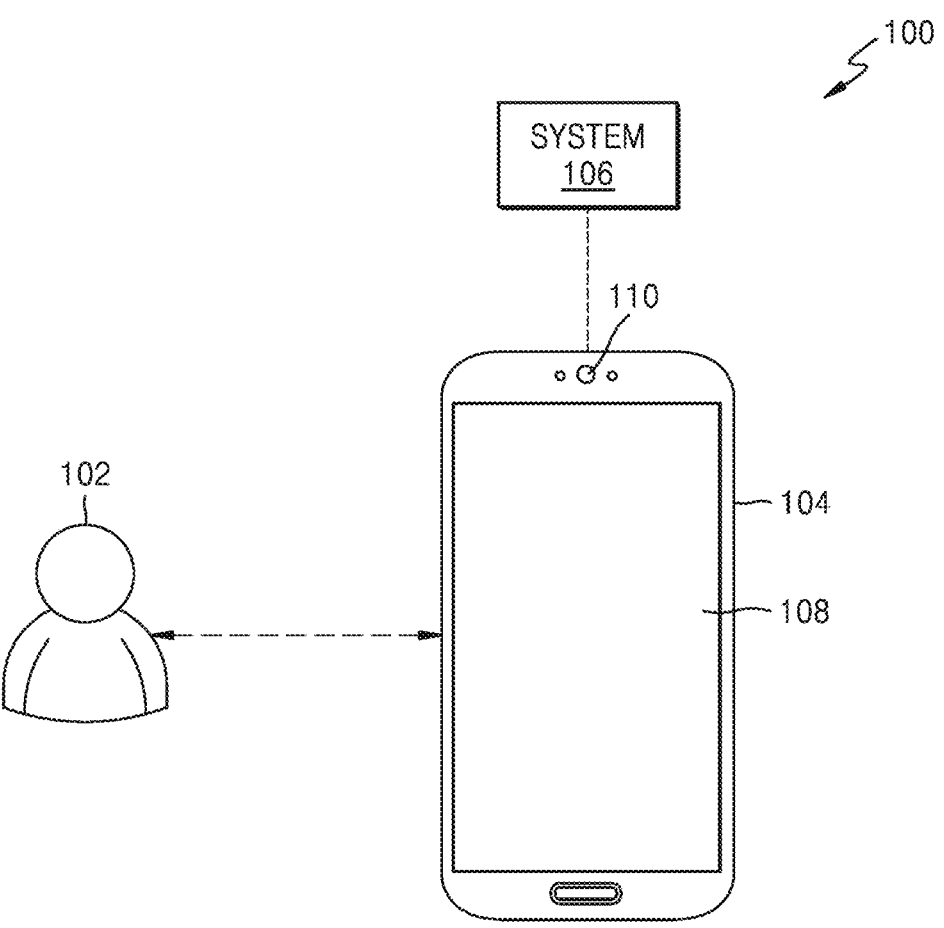
FIG. 1 illustrates an implementation of a system to establish a communication between a user and a communication device for accessing at least one application of the communication device, according to an embodiment of the disclosure.

Further, skilled artisans will appreciate that elements in the drawings are illustrated for simplicity and may not have been necessarily been drawn to scale. For example, the flow diagrams illustrate the method in terms of the most prominent steps involved to help understanding of aspects of the present disclosure. Furthermore, in terms of the construction of the device, one or more components of the device may have been represented in the drawings by conventional symbols, and the drawings may show only those specific details that are pertinent to understanding the embodiments of the present disclosure so as not to obscure the drawings with details that will be readily apparent to those of ordinary skill in the art having benefit of the description herein.

BEST MODE FOR CARRYING OUT THE INVENTION

The disclosure has been made to address at least the disadvantages described above and to provide at least the advantages described below.

In accordance with an aspect of the disclosure, a method of supporting voice instructions to execute an application is provided. The method includes obtaining a sequence for operating an application based on a user interaction, receiving a voice instruction with respect to the application from a user, extracting at least one keyword included in the voice instruction, comparing the at least one keyword with pre-stored keywords in a device, and executing the application to perform an action corresponding to the voice instruction.

In an embodiment, the user interaction includes operating the application for an intended purpose of the user.

In an embodiment, the user interaction includes at least one of non-voice user actions and voice instructions corresponding to the sequence for operating the application.

In an embodiment, the non-voice user actions include at least one of a touch input by the user and a gesture input by the user.

In an embodiment, the method further includes determining that the application is unavailable for voice instruction of the user.

In an embodiment, the method further includes in response to the determination that the application is unavailable for the voice instructions of the user, identifying a second device which has data to access the application, transmitting the voice instruction to the second device; receiving the data to access the application from the second device, executing the application corresponding to the voice instruction based on the data to access the application.

In an embodiment, the method further includes receiving a second voice instruction indicative of a request to access a second application, detecting a course-of-action of the user to execute the second application when the second voice instruction is unrecognizable, and determining the course-of-action of the user as a preferred action for executing the second application upon subsequently receiving a similar voice instruction to the second voice instruction.

In an embodiment, the course-of-action includes steps of providing manual inputs by the user to the device for executing the second application.

In an embodiment, the manual inputs include at least one touch input or at least one gesture input by the user.

In an embodiment, the extracting of the at least one keyword includes extracting the at least one keyword based on a natural language processing (NPL) method.

In accordance with another aspect of the disclosure, provided is an apparatus for supporting voice instructions. The apparatus includes a memory configured to store a set of pre-stored keywords, and a processor configured to obtain a sequence for executing an application based on a user interaction, receive a voice instruction with respect to the application from a user, extract at least one keyword included in the voice instruction, compare the at least one keyword with the set of pre-stored keywords, and execute the application to perform an action corresponding to the voice instruction.

In accordance with another aspect of the disclosure, provided is a non-transitory computer readable medium embodying a computer program for operating an electronic device including a memory and a processor, the computer program comprising computer readable instructions that, when executed by the processor, cause the electronic device to obtain a sequence for operating an application based on a user interaction, receive a voice instruction with respect to the application from a user, extract at least one keyword included in the voice instruction. compare the at least one keyword with pre-stored keywords in a device, and execute the application to perform an action corresponding to the voice instruction.

Mode for the Invention

Embodiments of the disclosure will be described herein below with reference to the accompanying drawings. However, the embodiments of the disclosure are not limited to the specific embodiments and should be construed as including all modifications, changes, equivalent devices and methods, and/or alternative embodiments of the present disclosure. In the description of the drawings, similar reference numerals are used for similar elements.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may use corresponding components regardless of importance or an order and are used to distinguish a component from another without limiting the components. These terms may be used for the purpose of distinguishing one element from another element. For example, a first user device and a second user device indicates different user devices regardless of the order or importance. For example, a first element may be referred to as a second element without departing from the scope the disclosure, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," " adapted to," "made to," or "capable of" according to a context. The term "configured to (set to)" does not necessarily mean "specifically designed to" in a hardware level. Instead, the expression "apparatus configured to" may mean that the apparatus is "capable of" along with other devices or parts in a certain context. For example, "a processor configured to (set to) perform A, B, and C" may mean a dedicated processor (e.g., an embedded processor) for performing a corresponding operation, or a generic-purpose processor (e.g., a central processing unit (CPU) or an application processor (AP)) capable of performing a corresponding operation by executing one or more software programs stored in a memory device.

The terms used in describing the various embodiments of the disclosure are for the purpose of describing particular embodiments and are not intended to limit the disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. Terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the disclosure.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the disclosure may include at least one of an application-specific integrated circuit (ASIC) chip, a field-programmable gate array (FPGA), and a programmable-logic device for performing operations which has been known or are to be developed hereinafter.

An electronic device or a communication device according to the disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

The communication device may be a home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

The communication device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller machine (ATM), point of sales (POS) devices, or an Internet of things (IoT) device (e.g., a light bulb, various sensors, electric or gas meter, a sprinkler device, a fire alarm, a thermostat, a streetlamp, a toaster, a sporting goods, a hot water tank, a heater, a boiler, etc.).

The communication device may include at least one of a part of furniture or a building/structure, an electronic board, an electronic signature receiving device, a projector, and various kinds of measuring instruments (e.g., a water meter, an electric meter, a gas meter, and a radio wave meter). The communication device may be a combination of one or more of the aforementioned various devices. The electronic device may also be a flexible device. Further, the communication device is not limited to the aforementioned devices, and may include an electronic device according to the development of new technology.

Hereinafter, a communication device will be described with reference to the accompanying drawings. In the disclosure, the term "user" indicates a person using an electronic device or a device (e.g., an artificial intelligence electronic device) using an electronic device.

FIG. 1 illustrates an implementation of a system to establish a communication between a user and a communication device for accessing at least one application of the communication device, according to an embodiment of the disclosure. The communication device 104 may include, but is not limited to, a smartphone, a tablet, a Personal Digital Assistant (PDA), a smart-watch, an Artificial Intelligence (AI) speaker, and a voice assistant device. The communication device 104 may include, but is not limited to, a microphone (not shown), a touch-sensitive screen 108, and a camera 110. The present disclosure is explained with the communication device 104 as a smartphone. However, it should be appreciated by a person skilled in the art that it should not be construed as limiting, and the present disclosure is equally applicable to other examples of the communication devices as well, without departing from the scope of the present disclosure.

The system 106 may be an electronic device or another communication device. The system 106 may be in communication with the microphone and the touch-sensitive screen 108 to receive instructions—e.g. voice instructions or voice commands—from the user 102. The system 106 may learn or be trained to operate at least one application, hereinafter referred to as the application, as performed in response to a user interaction with the system 106 with respect to the application. The system 106 may monitor the interaction, for example, as occurred through non-voice user activities, such as touch inputs to the touch-sensitive screen 108 of the communication device 104 and gestures to operate the application, and corresponding functions of the application as performed in response. Therefore, the system 106 may learn different flows of operation of the application in response to various instructions, such as touch inputs and voice instructions as received from the user 102.

In an embodiment, the user 102 may provide the communication device 104 with a voice instruction to access an application. The system 106 may receive the voice instruction and identify or extract at least one keyword included in the voice instruction. The system 106 may compare the at least one keyword with a set of pre-stored keywords. The set of pre-stored keywords is stored over a duration of usage of the application. Based on the learning and the comparison, the system 106 may operate or execute the application to perform an action corresponding to the voice instruction. Constructional and operational details of the system 106 are provided in detail referring to FIG. 2.

Figure 2:
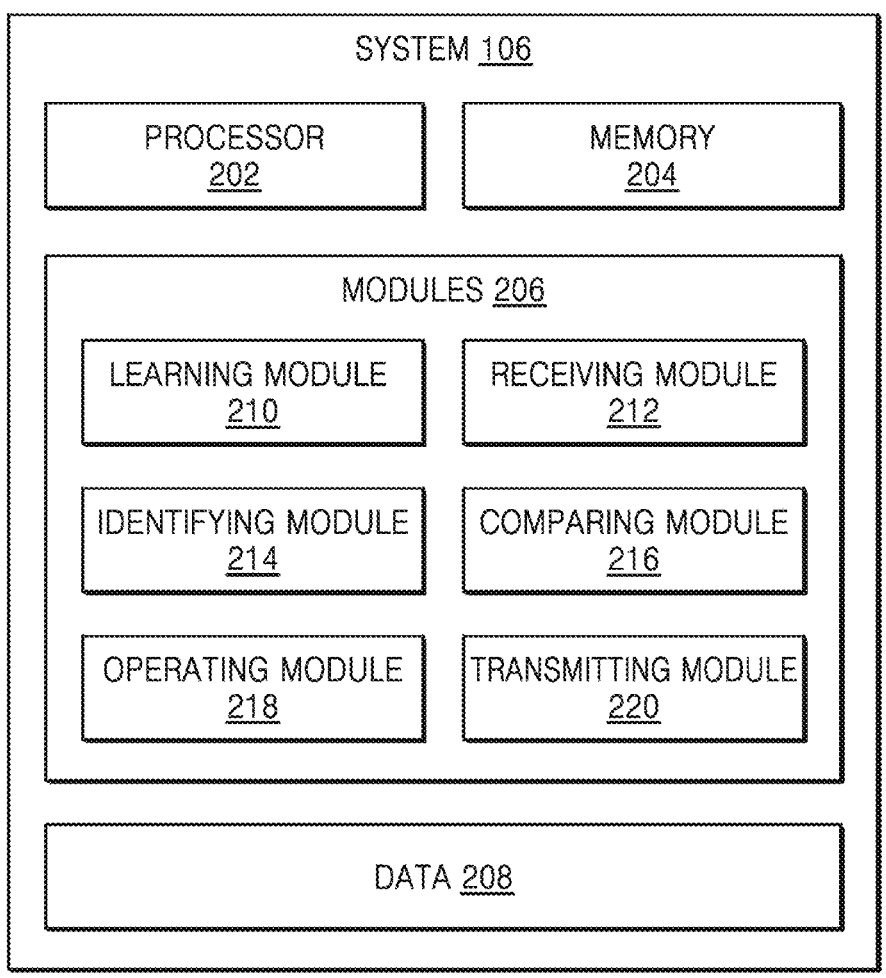
FIG. 2 illustrates a block diagram of a system, according to an embodiment of the disclosure.

FIG. 2 illustrates a block diagram of a system, according to an embodiment of the disclosure. For the sake of brevity, features of the disclosure that are already disclosed in the description of FIG. 1 are not explained in detail in FIG. 2 and therefore, the description of FIG. 2 should be read in conjunction with FIG. 1.

The system 106 may include a processor 202, a memory 204, modules 206, and data 208. The modules 206 and the memory 204 are coupled to the processor 202. The processor 202 can be a single processing unit or a number of units, all of which could include multiple computing units. The processor 202 may be implemented as one or more microprocessors, microcomputers, microcontrollers, digital signal processors, central processing units, state machines, logic circuitries, and/or any devices that manipulate signals based on operational instructions. Among other capabilities, the processor 202 is configured to fetch and execute computer-readable instructions and data stored in the memory 204. The data 208 may be also implemented as database or combined to a memory 204.

The memory 204 may include any non-transitory computer-readable medium known in the art including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes.

The modules 206, amongst other things, include routines, programs, objects, components, data structures, etc., which perform particular tasks or implement data types. The modules 206 may also be implemented as, signal processor(s), state machine(s), logic circuitries, and/or any other device or component that manipulate signals based on operational instructions. The modules 206 may be implemented as at least one hardware processor or may be combined to the processor 202.

Further, the modules 206 can be implemented in hardware, instructions executed by a processing unit, or by a combination thereof. The processing unit can comprise a computer, a processor, such as the processor 202, a state machine, a logic array or any other suitable devices capable of processing instructions. The processing unit can be a general-purpose processor which executes instructions to cause the general-purpose processor to perform the required tasks or, the processing unit can be dedicated to perform the required functions. In another aspect of the present disclosure, the modules 206 may be machine-readable instructions (software) which, when executed by a processor/processing unit, perform any of the described functionalities.

In an embodiment, the modules 206 may include a learning module 210, a receiving module 212, an identifying module 214, a comparing module 216, an operating module 218, and a transmitting module 220. The learning module 210, the receiving module 212, the identifying module 214, the comparing module 216, the operating module 218, and the transmitting module 220 may be in communication with each other. Further, the data 208 serves, amongst other things, as a repository for storing data processed, received, and generated by one or more of the modules 206.

The learning module 210 may learn or obtain the operation—an operational sequence or a sequence for an operation—of the application as performed based on the user interaction with the system 106. The learning or obtaining the operation of the application may be performed if it is determined that the application is not available for voice instructions of a user. In an embodiment, the user interaction may be performed with respect to the application for accomplishing an intended purpose such as purchasing products, sending an email, setting an alarm, etc. In an embodiment, the user interaction may be performed through at least one of the non-voice user activities and/or voice instructions. The non-voice user activities may include, but are not limited to, touch input-based activities and gesture-based activities.

For example, when the user 102 is operating or executing the application for any purpose, the system 106 may learn instructions, provided through touch inputs or gestures, as provided by the user 102 to launch a specific function of the application. Considering that the application may not initially be configured to operate based on the voice instructions, the user 102 may operate the application using touch inputs or the gestures, and the learning module 210 may be trained to learn the operation or the operational sequence of the application accordingly.

In an embodiment, the user 102 may provide one or more voice instructions to the system 106 for accessing or executing the application. However, since the application is not yet ready to operate in response to the voice instructions, the system 106 may not respond to the voice instructions and may not launch the application. Therefore, the user 102 may have to operate or execute the application either through the touch inputs or the gestures instead of the voice instructions. In an embodiment, the learning module 102 may learn the voice instructions which have not been recognized by the system 106 along with the subsequent touch inputs or the gestures received from the user 102 to access or launch the application. The learning module 102 may also map such voice instructions to the subsequent touch inputs or the gestures of executing the application for further processing.

Therefore, the system 106 may learn various work flows indicative of the instructions and the corresponding actions as performed in the application. The learning (or training) of the system 106 may continue throughout the entire operation of the system 106. The learning module 210 may be in communication with the operating module 218.

In an embodiment, the receiving module 212 may receive a voice instruction from the user 102. The voice instruction may be indicative of a request to access or execute the application. In an embodiment, the application may be a third-party application. The third-party application may be understood as an application that is primarily not configured to operate based on the voice instructions, that is not responsive to voice instructions, or that is not available for voice instructions. Therefore, device manufacturers or application developers may not have configured the application to operate based on the voice instructions. In an embodiment, the third-party application may be installed from an online application store. In an embodiment, the receiving module 212 may be in communication with the microphone of the communication device 104 to receive the voice instruction. Further, the receiving module 212 may communicate with the identifying module 214.

Upon the receipt of the voice instruction by the receiving module 212, the identifying module 214 may identify and/or extract the at least one keyword, hereinafter referred to as the keyword included in or forming the voice instruction. In an embodiment, the identifying module 214 may identify the keyword included in or forming the voice instruction, based on a Natural Language Processing (NLP) technique. The identifying module 214 may communicate with the comparing module 216.

The comparing module 216 may compare the at least one keyword with the set of pre-stored keywords. The set of pre-stored keywords is stored over a duration of the usage of the application by the user 102. Therefore, the pre-stored keywords are indicative of keywords included in or forming voice instructions as provided by the user 102 while using the application prior to the present usage. In another embodiment, the set of pre-stored keywords may be indicative of keywords stored in a cloud server (not shown). The cloud server may be formed by storing details pertaining to voice instructions of various users of the application over a period of time. The comparing module 216 may be in communication with the operating module 218.

In an embodiment, the keyword may match at least one of the pre-stored keywords.

In such an embodiment, based on the learning by the learning module 210 and the comparison by the comparing module 216, the operating module 218 may operate or execute the application to perform the action as associated with the voice instruction received by the receiving module 212. In an alternate embodiment, the keyword may not match the pre-stored keywords. In such an embodiment, the system 106 may request the user 102 to provide touch inputs to access or execute the application. While the user 102 is operating the application, the learning module 210 may learn the operations to be performed in case of receipt of such voice instruction including the variations the voice instruction. When a similar voice instruction is subsequently received from the user 102, the operating module 218 may operate or execute the application based on the learning.

In an embodiment, the receiving module 212 may receive another voice instruction, hereinafter referred to as the second voice instruction, from the user 102. The second voice instruction may be indicative of a request to access another application, hereinafter referred to as the second application, of the communication device 104. In an embodiment, the second voice instruction may not be recognized by the system 106. Therefore, the second voice instruction may not match any of the voice instructions as provided by the user 102 or with any of voice instructions as stored in the cloud server maintained as a database of voice instructions of various users of the second application. Since the second voice instruction is not recognized by the system 106, the system 106 may not operate to provide the access to the second application to the user 102.

In such an embodiment, the learning module 210 may detect a course-of-action of the user 102 to access or execute the second application. The course-of-action may be indicative of steps or sequences taken by the user 102, for example, providing manual inputs to the communication device 104 or touch inputs to the touch-sensitive screen 108 of the communication device 104, for accessing or executing the second application. Following the detection of the course-of-action, the learning module 210 may determine the course-of-action as a preferred action to perform for accessing the second application, when a similar voice instruction to access the second application is subsequently received by the receiving module 212. In an embodiment, the system 106 may be a stand-alone device such as a mobile phone, a laptop computer, a PC, a server, etc.

Figure 3:
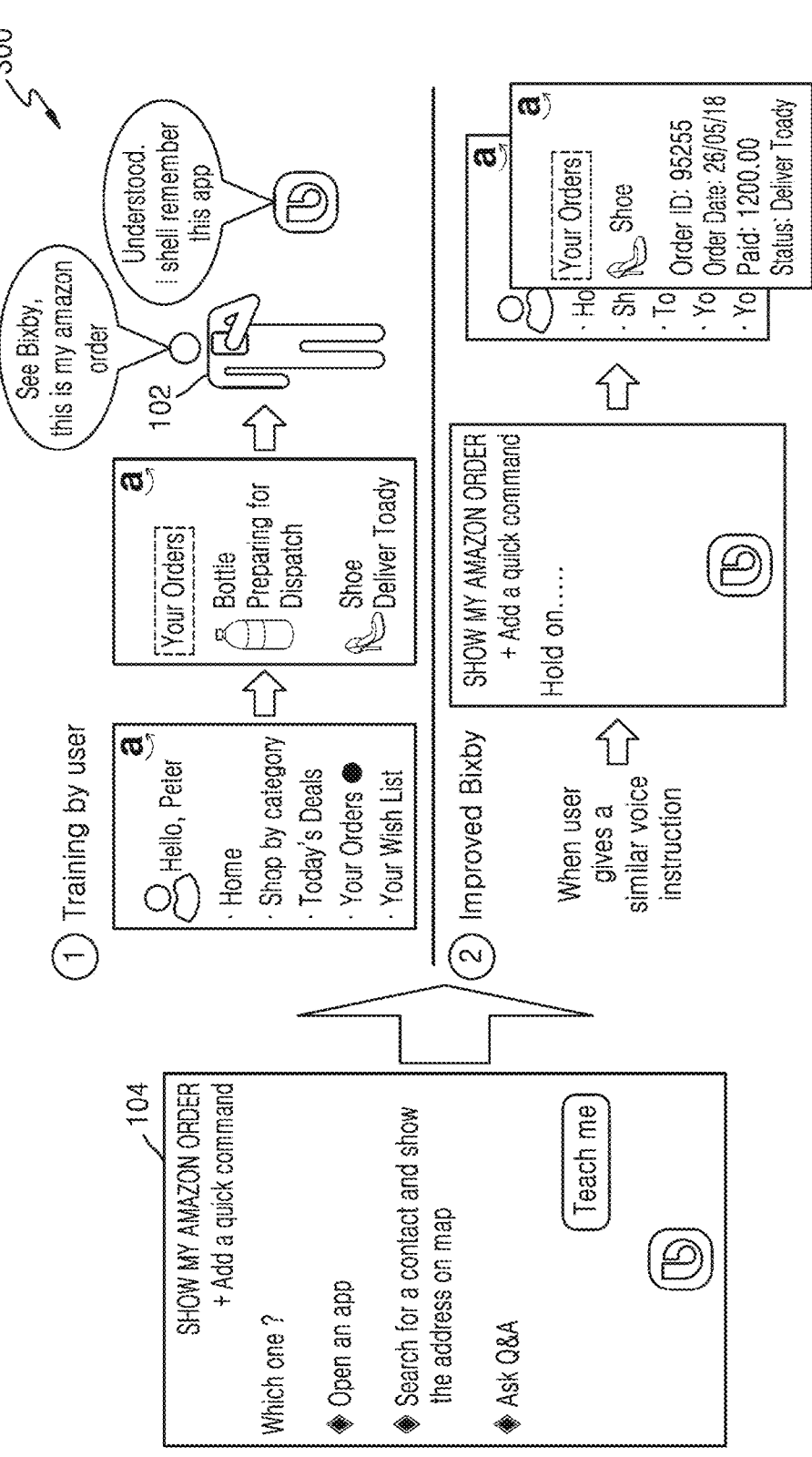
FIG. 3 illustrates an example of checking a status in an online shopping application, according to an embodiment of the present disclosure.

FIG. 3 illustrates an example of checking a status in an online shopping application, according to an embodiment of the disclosure.

In an embodiment, the communication device 104 may be any kind of smartphones. In an embodiment, the voice assistant interface of the communication device 104 is illustrated as Bixby but the voice assistant interface is not limited thereto. The voice assistant interface can be any kind of voice assistant interface. The user 102 may provide a voice instruction to Bixby as "Show my Amazon® order". Amazon® application may not readily be supported to respond to voice instructions. Therefore, the user 102 may provide touch inputs to the touch-sensitive screen 108 of the communication device 104 to operate the Amazon® application to access the Amazon® order. The system 106 may learn the course-of-action taken by the user 102 to access the Amazon® order.

The system 106 may store the series of instructions generated by a plurality of touch inputs for executing the Amazon® application to access the Amazon® order. The system 106 may also generate a matching table which maps the voice instruction of "Show my Amazon® order" to the course-of-action generated as described above.

Afterwards, when the user 102 inputs a similar voice instruction to a voice assistant for showing the Amazon® order, the system 106 may operate to follow the course-of-action as learnt from the user 102 in the previous attempt of accessing the application. Accordingly, the Amazon® order is shown to the user 102.

Figure 4:
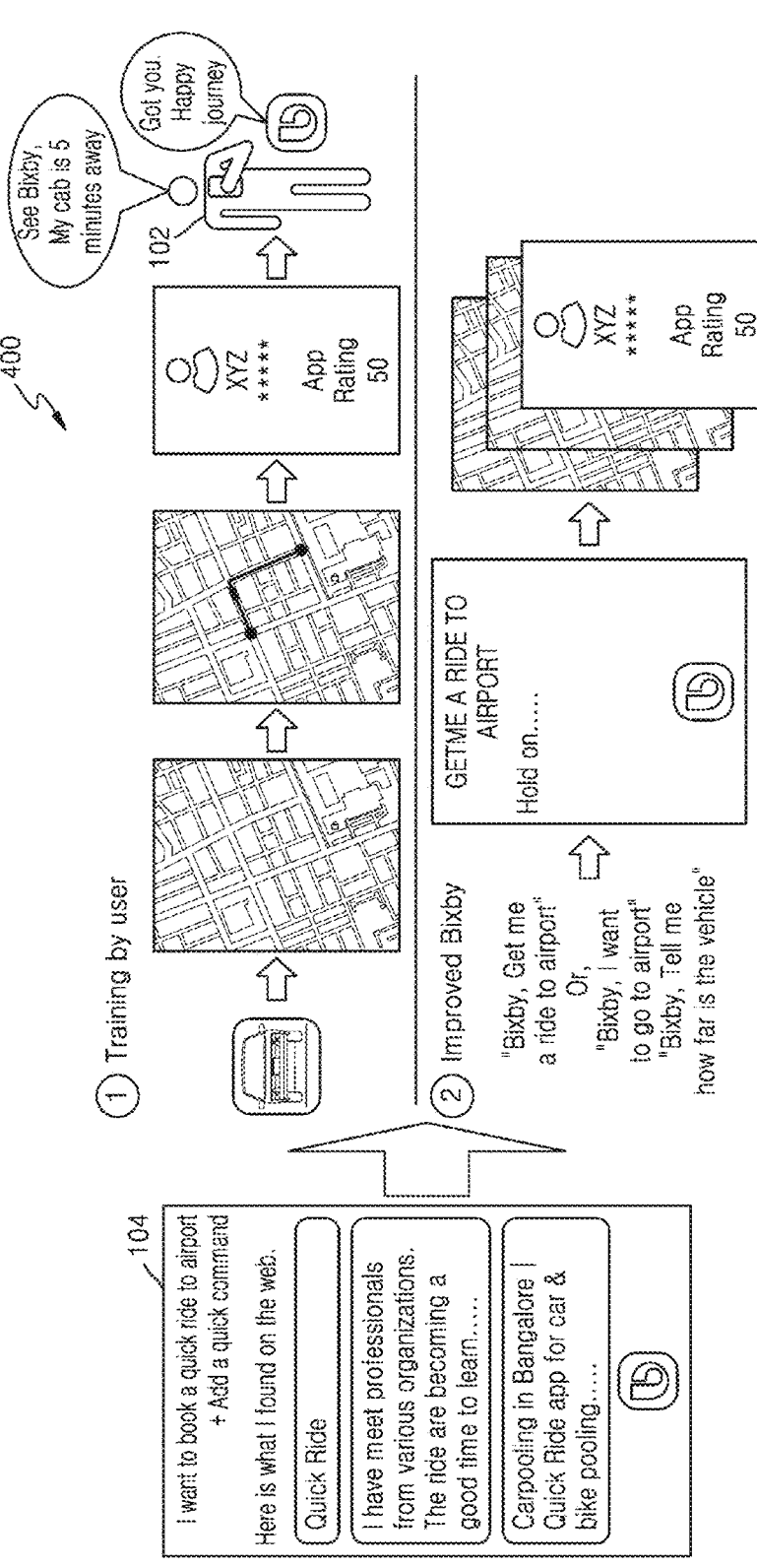
FIG. 4 illustrates an example of booking a cab through a cab-booking application, according to an embodiment of the disclosure.

FIG. 4 illustrates an example of booking a cab through a cab-booking application, according to an embodiment of the disclosure.

In an embodiment, the user 102 may provide a voice instruction to the communication device 104 or Bixby as "I want to book a Quick ride ® to airport". The Quick ride® application is a cab booking application and may not be supported to respond to voice instructions. Therefore, the user 102 may provide a sequence of touch inputs to the touch-sensitive screen 108 of the communication device 104 to operate the Quick ride ® application to book a cab to a certain destination. The system 106 may learn the course-of-action taken by the user 102 to book the ride based on the sequence of touch inputs.

Afterwards, when the user 102 may provide a similar voice instruction to the voice assistant for booking a ride, such as "Bixby, Get me a ride to Airport" or "Bixby, I want to go to Airport", the system 106 may operate to retrieve the stored course-of-action as learnt from the user 102 in the previous attempt of accessing the application. Accordingly, the system 106 may book a ride for the user 102 to go to the Airport. Further, based on the learning, the system 106 may also respond to similar voice instructions related to booking of the ride. For example, when the user 102 provides a voice instruction as "Bixby, Tell me how far is the vehicle", the system 106 may respond with an answer to the question after accessing the application. Therefore, once the system 106 monitors any user interface of the application, the system 106 may learn all functions associated with different tabs available on the user interface.

For example, in case of checking the order status on the online shopping application, the system 106 may also be able to respond to queries concerning other tabs available on the user interface having a "check order status tab". Such other tabs may include, but are not limited to, "your orders", "your wish list", and "your account".

Figure 5:
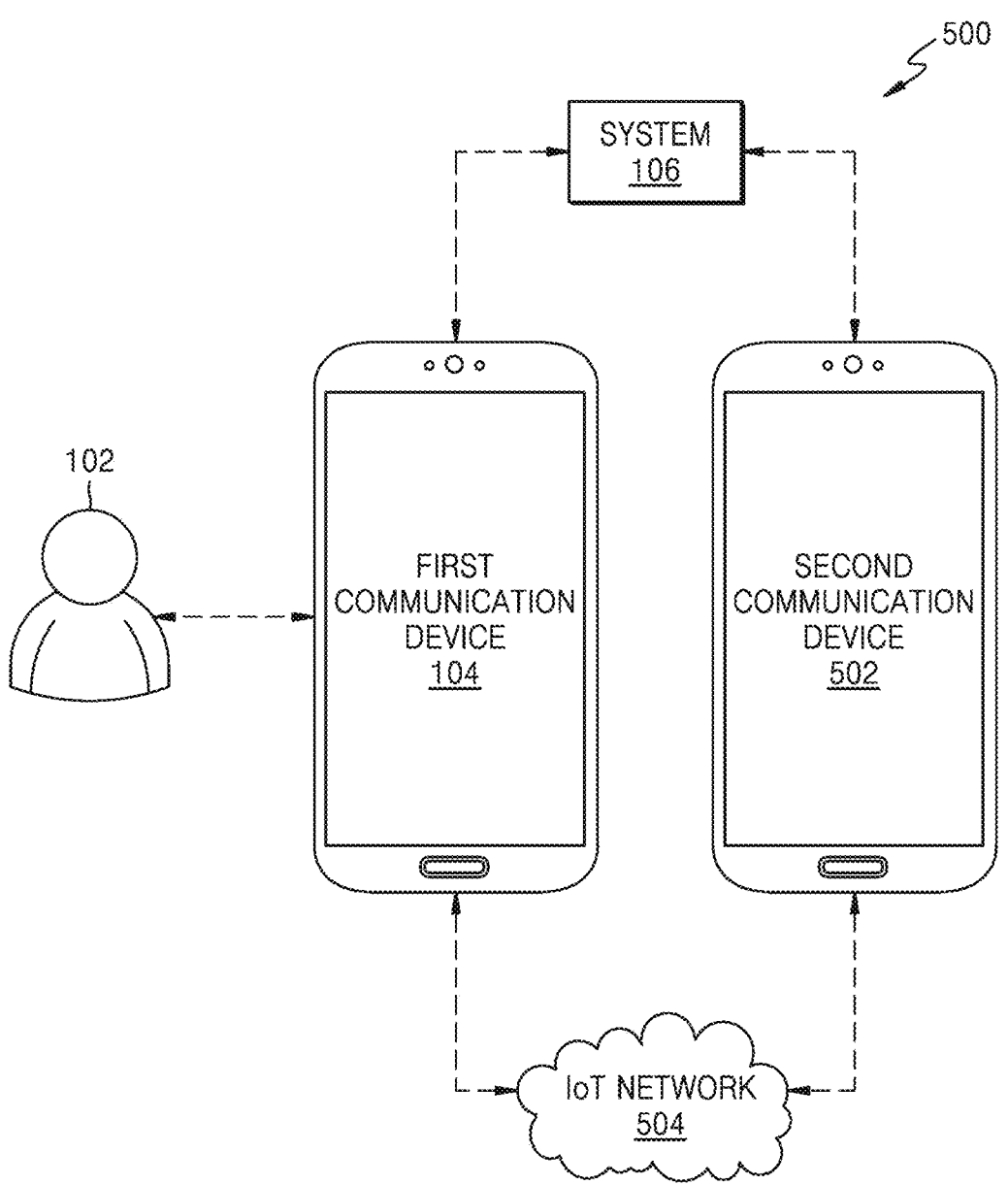
FIG. 5 illustrates a communication device and a second communication device through the system for accessing an application, according to an embodiment of the disclosure.

In an embodiment, details pertaining to the access of the application may not be available at the communication device 104, interchangeably referred to as the first communication device 104. In such an embodiment, the identifying module 214 may identify another communication device, hereinafter referred to as the second communication device, in communication with the communication device 104. FIG. 5 illustrates a communication device and a second communication device through the system for accessing an application, according to an embodiment of the disclosure.

In an embodiment, the communication device 104 and the second communication device 502 may be in communication with each other through a network such as an Internet-of-Things (IoT) network 504, a wireless network or a wired network. For the sake of brevity, features of the present disclosure that are already disclosed referring to FIG. 1, FIG. 2, FIG. 3, and FIG. 4 are not explained in detail in the description of FIG. 5 and therefore, the description referring to FIG. 5 should be read in conjunction with the description of previous drawings.

The second communication device 502 may be understood as the communication device having the details or relevant data to access the application. Referring to FIG. 2 and FIG. 5, in such an embodiment, the transmitting module 220 of the system 106 may transmit the voice instruction to the second communication device 502 over the IoT network 504 if it is determined that the communication device 104 is not able to (or unavailable to) access the application in response to voice instructions of the user. In response to the transmission of the voice instruction, the receiving module 212 may receive the details or the relevant data for accessing the application at the second communication device 502. Based on the details or the data, the processor 202 may operate or execute the application to perform the action associated with the voice instruction.

Figure 6:
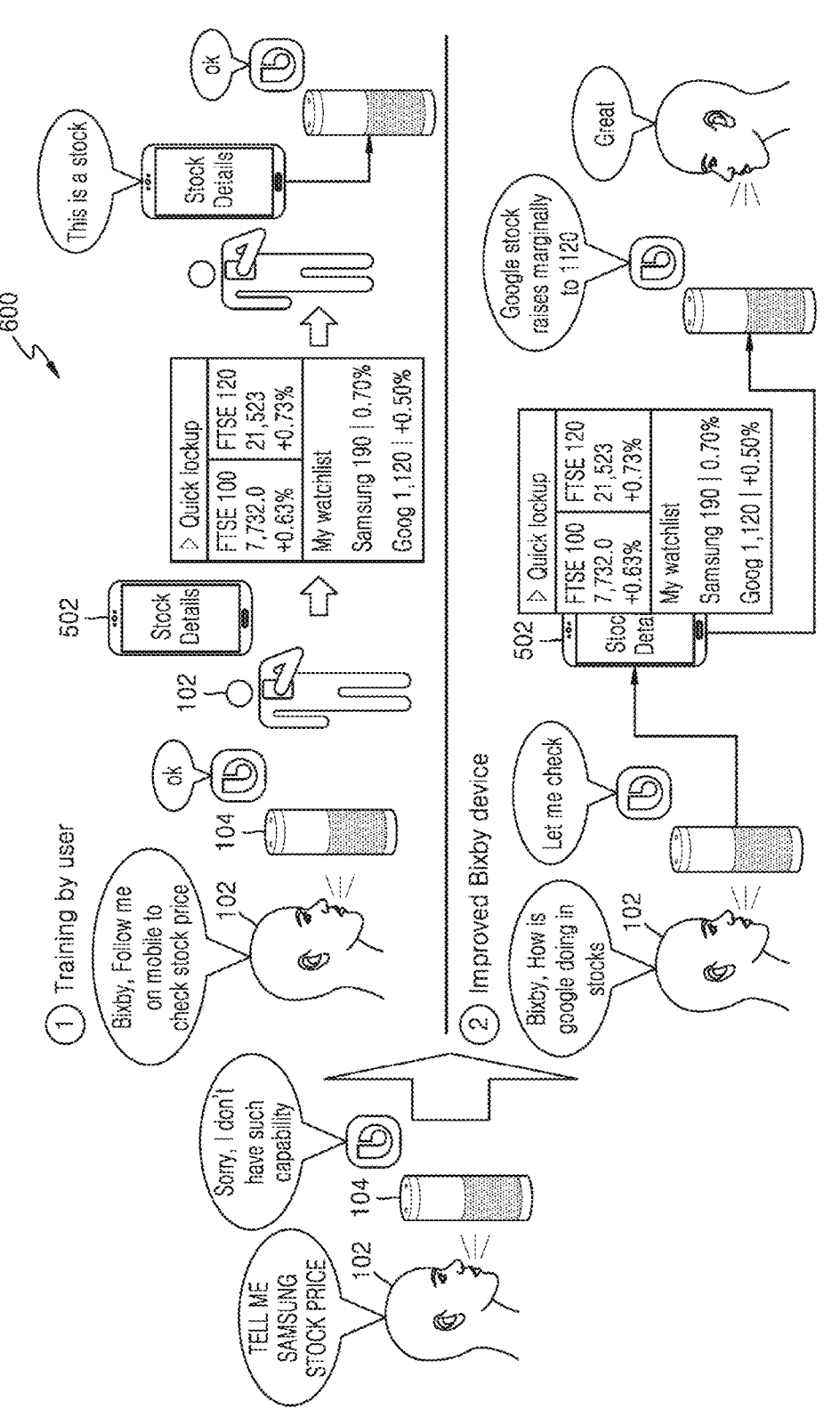
FIG. 6 illustrates an example of checking details of a stock through a stock tracking application, according to an embodiment of the disclosure.

FIG. 6 illustrates an example of checking details of a stock through a stock tracking application, according to an embodiment of the disclosure.

In an embodiment, the first communication device 104 is a device equipped with a voice assistant of Bixby. The user 102 may provide a voice instruction to Bixby as "Tell me Samsung stock price". It is assumed that Bixby cannot support any stock tracking application. Therefore, the user 102 may ask the first communication device 104 to follow his/her course-of-action on the second communication device 502, for example, a smartphone, in communication with the first communication device 104 to access the stock tracking application.

The user 102 may then provide a sequence of touch inputs to the touch-sensitive screen 108 of the second communication device 502 to operate a stock tracking application, such as Yahoo®, for checking the stock price of Samsung. The system 106 may learn the course-of-action taken by the user 102 to check the stock price. In fact, the system 106 may learn how to check stock prices of other companies as well. Since a company name, such as Samsung, B, and Google® are merely interchangeable parameters in such voice instructions, the system 106 may learn how to search for other stock prices as well, just by learning to perform the functions for one of such companies.

For example, afterwards, when the user 102 inputs a similar voice instruction to the first communication device 104 for checking a stock price, for example, "Hi Bixby, how is Google® doing in stocks", the system 106 may operate to follow the course-of-action as learnt from the user 102 in the previous attempt of accessing the stock prices. In the present example, the system 106 may use the first communication device 104 to access a portal site on the second communication device 502 for checking the stock price. Accordingly, the system 106 may provide the user 102 with the stock price.

Similarly, the user 102 may provide a voice instruction, for example, "Search for mobile phones on Amazon®" and the system 106 may learn to search for the mobile phones on Amazon®. Also, when the user 102 provides a voice instruction, for example, "Search for shoes on Amazon®" or "Search for laptops on Amazon®", the system 106 may use the previous training (learning) for performing the instructions. Therefore, the system 106 has the capability to understand interchangeable terms or logical variations in the voice instruction, and operate accordingly.

Figure 7:
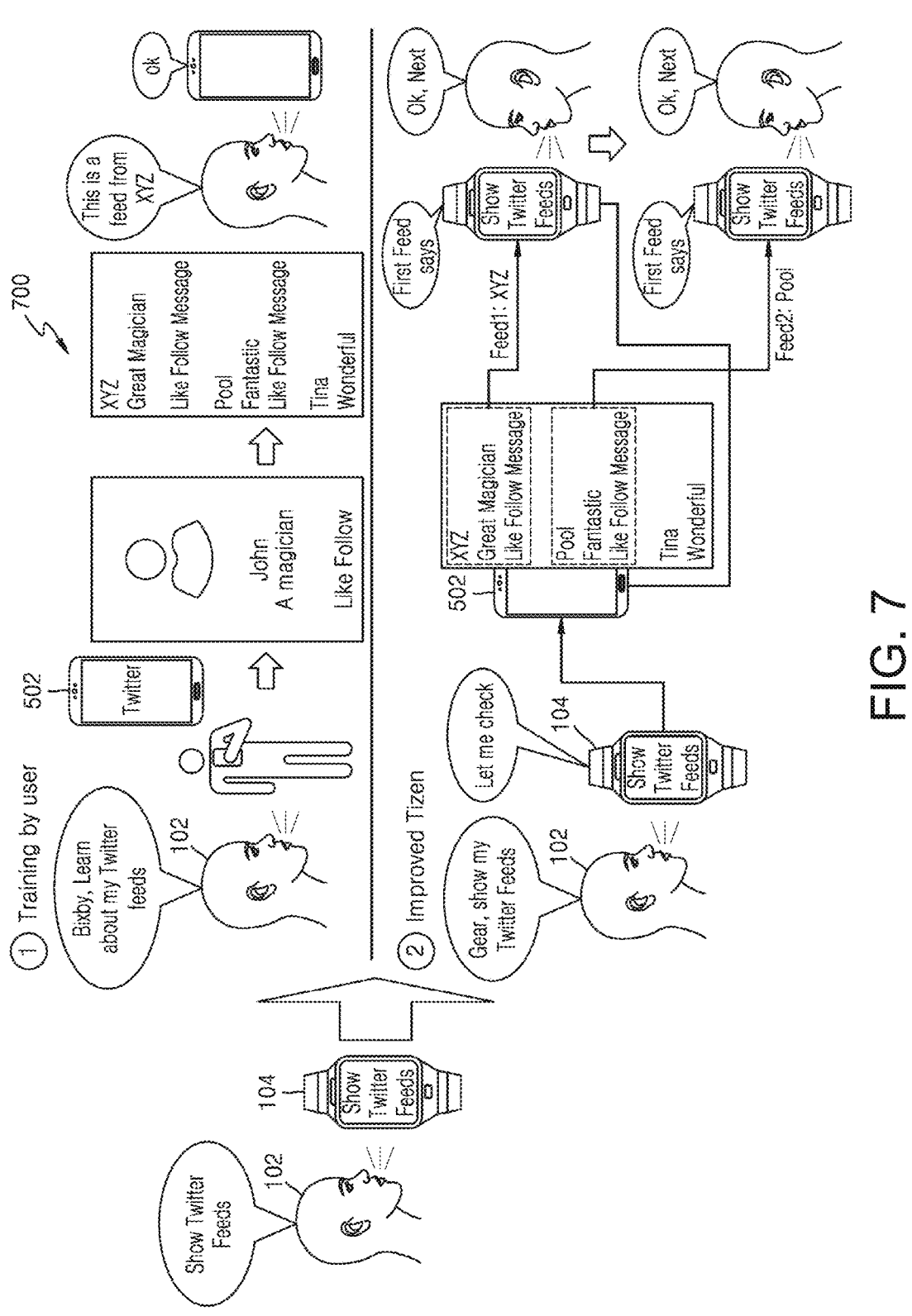
FIG. 7 illustrates an example of accessing a social networking application, according to an embodiment of the disclosure.

FIG. 7 illustrates an example of accessing a social networking application, according to an embodiment of the disclosure.

In an embodiment, the first communication device 104 is a wearable device. Considering that is the wearable device is operated with a different operating system, the system 106 has the capability of extending its functions across multiple operating system platforms, without departing from the scope of the present disclosure. Therefore, the system 106 also has the application across niche operating systems, such as Tizen or Real Time OS, which may run on small devices including, but not limited to, wearable devices such as smart-watches and fitness bands.

The user 102 may provide a voice instruction to the first communication device 104 as "Show Twitter® feeds". In an embodiment, Twitter® may not be supported by first communication device 104. Therefore, the user 102 may ask the first communication device 104 to follow his/her course-of-action on the second communication device 502, for example, a smartphone which is in communication with the first communication device 104.

The user 102 may then provide a sequence of touch inputs to the touch-sensitive screen 108 of the second communication device 502 to access the Twitter® feed through a Twitter® application. The system 106 may learn the course-of-action taken by the user 102 to access the Twitter® feed.

Afterwards, when the user 102 may provide a similar voice instruction to the first communication device 104 for checking the Twitter® feed, the system 106 may operate to follow the course-of-action as learnt from the user 102 in the previous attempt of accessing the Twitter® feed. In the present example, the system 106 may use the first communication device 104 to access Twitter® feed on the second communication device 502.

Figure 8:
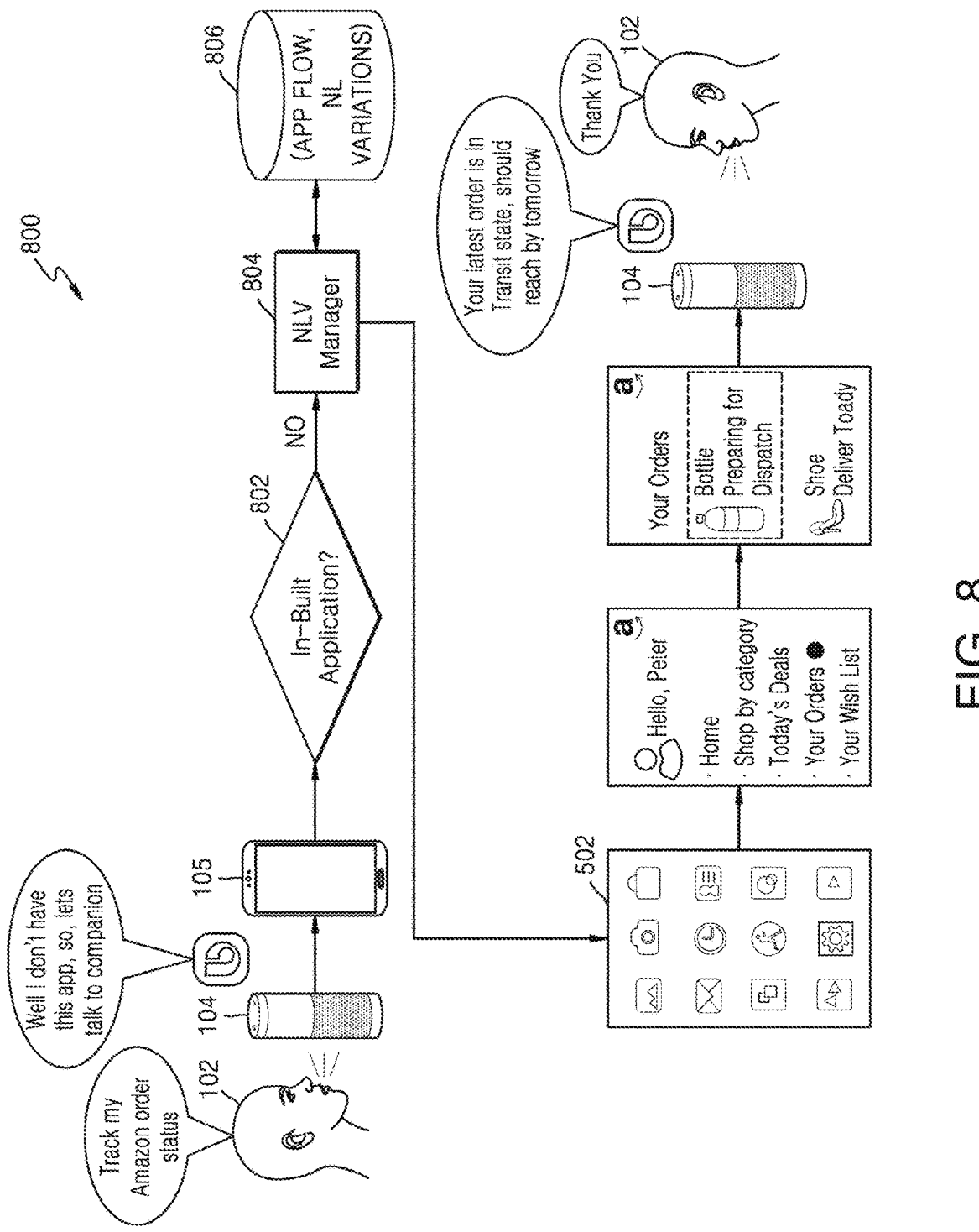
FIG. 8 illustrates an example of checking a status of an order placed on an online shopping application, according to an embodiment of the disclosure.

FIG. 8 illustrates an example of checking a status of an order placed on an online shopping application, according to an embodiment of the disclosure.

In an embodiment, the first communication device 104 is a Bixby device. The user 102 may provide a voice instruction to Bixby as "Track my Amazon® order". In an embodiment, the Bixby—a voice assistant—may not support Amazon® application in response to the voice instruction.

Therefore, the system 106 may transmit the voice instruction from the first communication device 104 to the second communication device 105. For example, the system may instruct the second communication device 105 to find a proper response to the voice instruction of "Track my Amazon® order" and revert in form of a Text. In an embodiment, at step 802, the system may determine whether the application, i.e., the Amazon® application, is an in-built application. When it is determined that the application is not an in-built application, it is determined whether the voice instruction is recognized by a Natural Language Variation (NLV) manager 804 of the system. In an embodiment, the NLV manager 804 may determine whether a course-of-action for responding to the voice instruction is pre-stored in a database 806 of the system.

In an embodiment when it is determined that the course-of-action is pre-stored in the database 806, the system may execute the course-of-action in the second communication device 105 to revert to the first communication device 104 with the status of the Amazon® order. The first communication device 104 may then provide the user 102 with the response, accordingly.

FIG. 9 is a flow diagram illustrating a method of accessing at least one application of the communication device, according to an embodiment of the disclosure.

The computer-implemented method 900 may hereinafter interchangeably be referred to as the method 900. The method 900 may be implemented in the system 106 using components thereof, as described above. In an embodiment, the method 900 may be executed by the processor 202. Further, for the sake of brevity, details of the disclosure that are explained in details referring to FIG. 1, FIG. 2, FIG. 3, FIG. 4, FIG. 5, FIG. 6, FIG. 7, and FIG. 8 are not explained in detail referring to FIG. 9.

At block 902, the method 900 includes learning the operation of the application of the communication device 104, as performed based on the user interaction occurred with respect to the application. The user interaction may be performed through at least one of the non-voice user activities and the voice instructions. The non-voice activities may include, but are not limited to, the touch input-based activities and the gesture-based activities which correspond to and/or may be able to execute the application. In an embodiment, the application is a third-party application. The third-party application is an application that is primarily not configured to operate based on the voice instruction. In an embodiment, the learning module 210 of the system 106 may learn the operation and/or be trained to perform the operation.

At block 904, the method 900 includes receiving the voice instruction from the user 102. The voice instruction is indicative of a request to access the application. In an embodiment, the receiving module 212 of the system 106 may receive the voice instruction.

At block 906, the method 900 includes identifying or extracting at least one keyword forming the voice instruction. In an embodiment, the at least one keyword forming the voice instruction is identified based on the NLP technique. In an embodiment, the identifying module 214 of the system 106 may identify the keyword.

At block 908, the method 900 includes comparing the keyword with the set of prestored keywords. The set of pre-keywords is stored over a duration of usage of the application. In an embodiment, the set of pre-stored keywords is stored in the cloud repository. The cloud repository may be formed by storing the details pertaining to the voice instructions of the users of the application over a period of time. In an embodiment, the comparing module 216 of the system 106 may compare the keyword with the set of pre-stored keywords.

At block 910, the method 900 includes operating the application to perform the action associated with the voice instruction, based on the learning and the comparison. In an embodiment, the operating module 218 of the system 106 may operate the application.

In an embodiment, the method 900 may include receiving another voice instruction, also referred to as the second voice instruction, from the user 102. The second voice instruction is indicative of a request to access another application, also referred to as the second application. The method 900 may further include detecting the course-of-action of the user to access another application, when the second voice instruction is not recognized. When a similar voice instruction to access the second application is subsequently received, the course-of-action may be determined as the preferred action to perform for accessing the second application.

In an embodiment, the method 900 may include identifying another communication device 502, also referred to as the second communication device 502, when details pertaining to the access of the application are not available at the communication device 104. In an embodiment the first communication device 104 and the second communication device 502 may be in communication with each other through a network such as the IoT network 504. The second communication device 502 has the details to access the application. The voice instruction may then be transmitted to the second communication device 502. In response to the transmission, the details pertaining to the access of the application may be received from the second communication device 502. Based on the details, the learning, and the comparison, the application may be operated to perform the action associated with the voice instruction.

Figure 10:
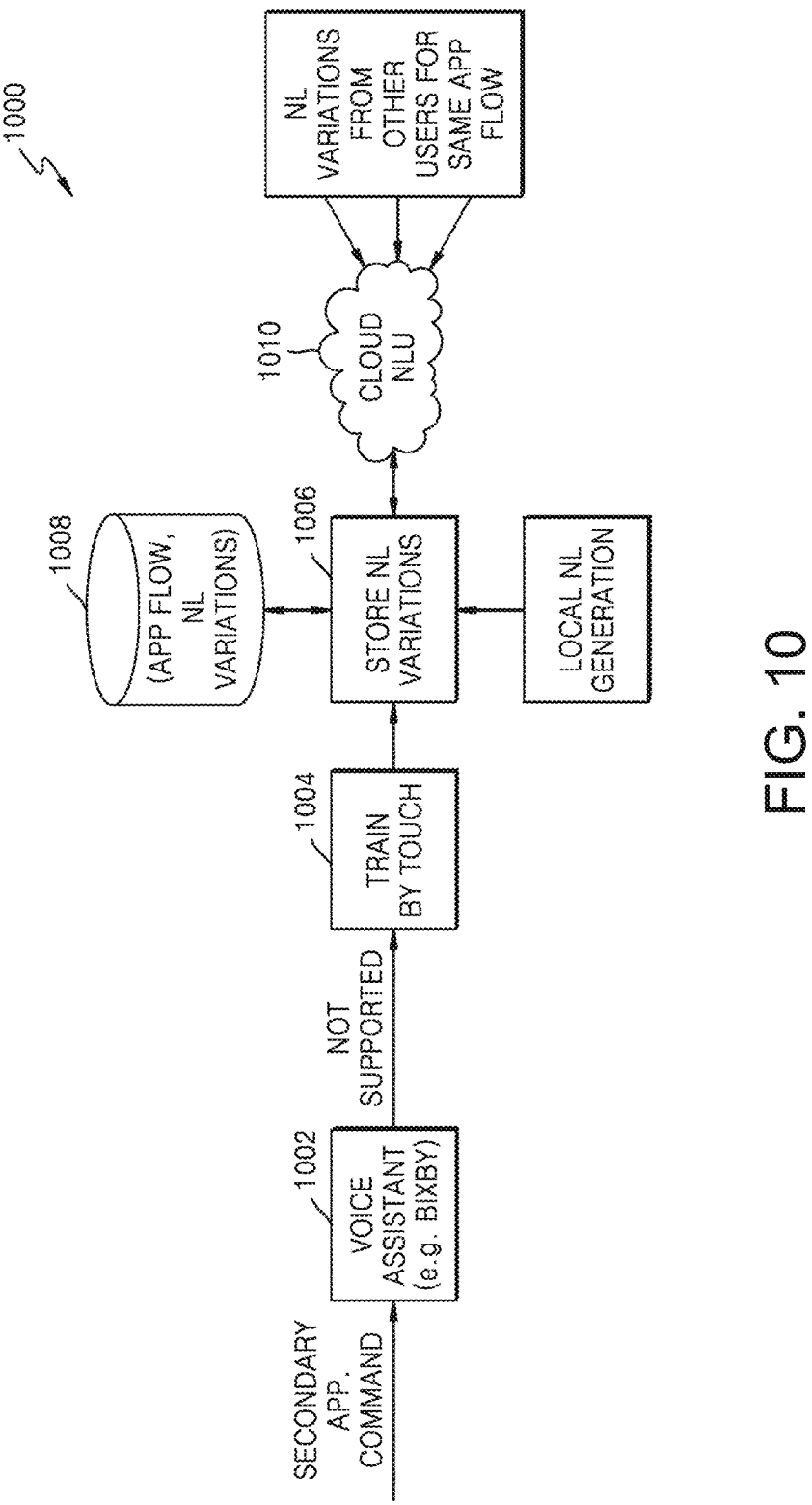
FIG. 10 is a flow diagram illustrating a method of training process, according to an embodiment of the disclosure.

FIG. 10 is a flow diagram illustrating a method of training process, according to an embodiment of the disclosure.

A computer-implemented method 1000 may hereinafter interchangeably be referred to as the method 1000. The method 1000 may be implemented in the system 106 using components thereof, as described above. In an embodiment, the method 1000 may be executed by the processor 202. Further, for the sake of brevity, details of the present disclosure that are explained in details referring to FIG. 1, FIG. 2, FIG. 3, FIG. 4, FIG. 5, FIG. 6, FIG. 7, FIG. 8, and FIG. 9 are not explained in detail referring to FIG. 10.

At block 1002, the first communication device 104, for example, a voice assistant, may receive a voice instruction from the user 102 for accessing a third-party application. In an embodiment, when the voice instruction for the third-party application is not supported by the first communication device 104, the method proceeds to block 1004. At block 1004, the method 1000 includes training the system 106 by touch inputs of the user 102. Based on the received touch inputs, at block 1006, the method 1000 includes storing Natural Language (NL) variations pertaining to the voice instruction. In an embodiment, the NL variations may be stored, based on local NL generation, and application flow and corresponding NL variations as stored in a database 1008.

In an embodiment, the NL variations so stored may also be synchronized with the cloud repository 1010 of Natural Language Understanding (NLU). The cloud repository 1010 may be formed by NL variations as learnt for different users of the same application.

In an embodiment, the system 106 may automatically generate shallow parsing-based variations from sparse data, for example from one or two utterances of voice instructions from the user 102. Since original utterance is chosen by the user 102 and not any developer, the original utterance indicates natural way of speaking for that user 102. Further, the system 106 may also generated shallow parsing-based as well as learning-based sentence for providing the user 102 with a response to the voice instruction.

Figure 11:
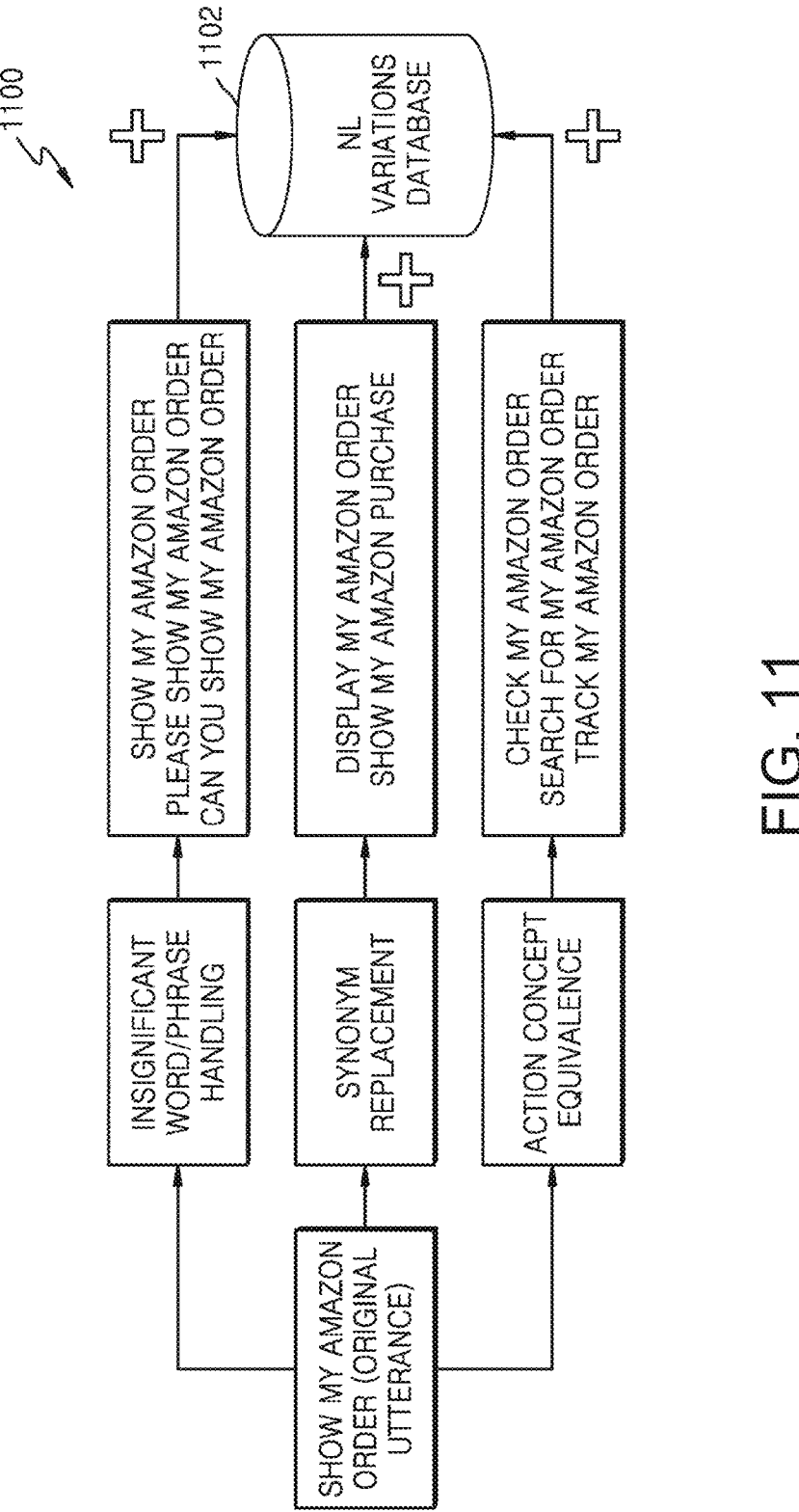
FIG. 11 is a flow diagram illustrating a method of learning variations in voice instructions, according to an embodiment of the disclosure.

FIG. 11 is a flow diagram illustrating a method 1100 of learning variations in voice instructions, according to an embodiment of the disclosure.

The computer-implemented method 1100 may hereinafter interchangeably be referred to as the method 1100. The method 1100 may be implemented in the system 106 using components thereof, as described above. In an embodiment, the method 1100 may be executed by the processor 202. Further, for the sake of brevity, details of the present disclosure that are explained in details referring to FIG. 1, FIG. 2, FIG. 3, FIG. 4, FIG. 5, FIG. 6, FIG. 7, FIG. 8, FIG. 9, and FIG. 10 are not explained in detail referring to FIG. 11.

In the illustrated embodiment, the voice instruction is "Show my Amazon® order". The learning of variations in the voice instruction may include, but is not limited to, insignificant word/phrase handling techniques, synonym replacement techniques, and action-concept equivalence techniques. With respect to the present example of the voices instruction, the insignificant word/phrase handling techniques may consider ignoring the word "my", and may consider adding words, such as "please" and "can you" at the beginning of the voice instruction. Therefore, if the user 102 may provide the instruction as "Show Amazon® order" or " Please show Amazon® order" or "Can you show my Amazon® order", the system 106 may treat the instructions in the same manner since these words are insignificant to the overall objective or intent of the user 102.

Similarly, the system 106 may use the synonym replacement techniques to consider replacements, such as "display" in place of "Show" and "purchase" in place of "order" in the present voice instruction. Therefore, the system 106 may treat such replacements in the same manner and the output of the voice instruction may not change.

Further, the system 106 may use the action-concept equivalence technique to consider an eventual intent of the user 102. In the present example, replacements, such as "Check", "Search for", and "Track" in place of "show" in the voice instruction may be acceptable and may generate the same outcome. All such voice instructions and potential variations may be stored to form a NL variation database 1102 to be used by the system 106.

Figure 12:
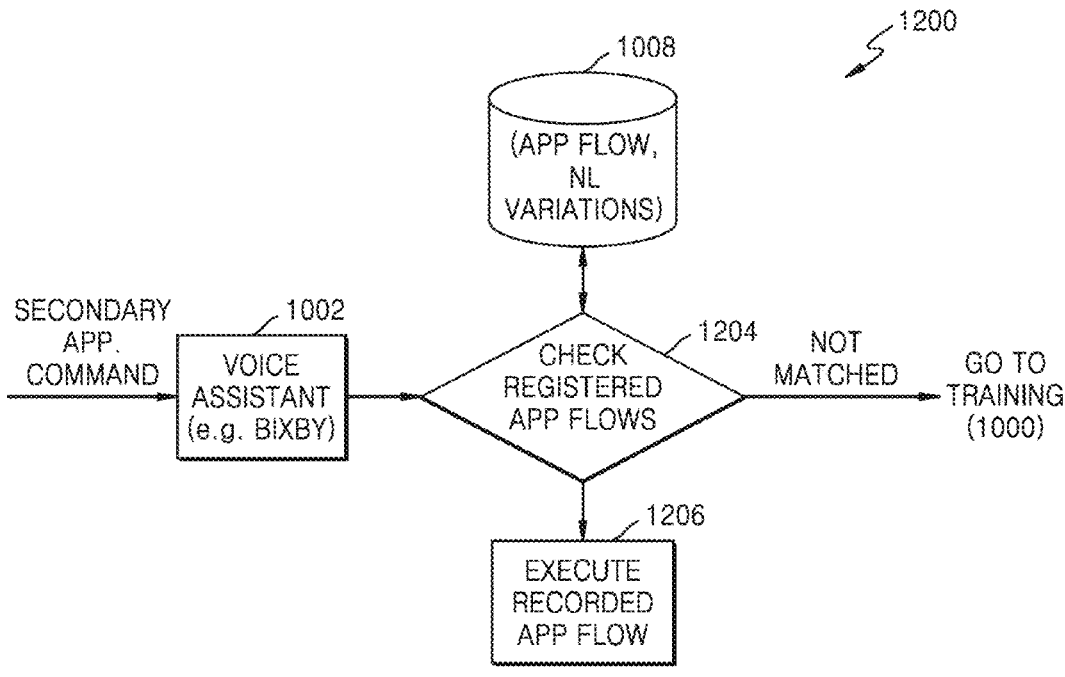
FIG. 12 is a flow diagram illustrating a method of implementing the system, according to an embodiment of the disclosure.

FIG. 12 is a flow diagram illustrating a method of implementing the system, according to an embodiment of the disclosure.

The computer-implemented method 1200 may hereinafter interchangeably be referred to as the method 1200. The method 1200 may be implemented in the system 106 using components thereof, as described above. In an embodiment, the method 1200 may be executed by the processor 202. Further, for the sake of brevity, details of the present disclosure that are explained in details referring to FIG. 1, FIG. 2, FIG. 3, FIG. 4, FIG. 5, FIG. 6, FIG. 7, FIG. 8, FIG. 9, FIG. 10, and FIG. 11 are not explained in detail in the description of FIG. 12.

At block 1202, the first communication device 104, for example, a voice assistant, may receive the voice instruction from the user 102 for accessing a third-party application. In an embodiment, when the voice instruction for the third-party application is supported by the first communication device 104, the method branches to block 1204. At block 1204, it is determined whether a course-of-action to respond to the voice instruction is available. In an embodiment when it is determined that the course-of-action is available, the method branches to block 1206. At block 1206, the course-of-action is followed by the system 106 to respond appropriately to the voice instruction. In another embodiment when it is determined that the course-of-action is not available, the method 1200 proceeds to learning or training of the system 106 for the voice instruction.

As would be gathered, the disclosure offers a comprehensive approach of accessing third-party applications of the communication device 104. The system 106 and the methods 900, 1000, 1100, and 1200 allow the user 102 to access the third-party application through voice instructions. Even when an application is not supported for voice-based support, the system 106 allows for training of the system 106 to access the third-party application, based on the course-of-action as followed by the user 102.

Further, the system 106 considers various possibilities of acceptable variations in the utterance of the voice instructions by the user 102. The system 106 also allows the user 102 to add multiple variations to utterances of the voice instructions. Accordingly, the system 106 generalizes the user's specific utterance based on the NLP techniques. In addition, the system 106 creates a social crowd-sourced cloud repository 1010 to learn utterances of different users of the application. Therefore, insignificant variations in the utterance of a voice instruction are appropriately handled by the system 106 to ensure a great user experience.

Therefore, firstly, a more personalized way of accessing the application is learnt by the system 106 which of course ensures a more effective and satisfying experience to the user 102. Moreover, an overall time duration of training of the system 106 is significantly reduced, for example, due to per-user based utterance consideration, and maintaining of cloud repository 1010 of utterances used by other users as well. Also, an overall accuracy of the response of the system 106 is high. Therefore, the present disclosure offers the system 106 and the methods 900, 1000, 1100, 1200 that are comprehensive, flexible, accurate, intelligent, time-saving, secure, and consistent.

While specific language has been used to describe the present disclosure, any limitations arising on account thereto, are not intended. As would be apparent to a person in the art, various working modifications may be made to the method in order to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

The invention claimed is:

1. A method of supporting voice instructions, the method comprising:
    obtaining a sequence for operating an application based on a user interaction;
    receiving a voice instruction with respect to the application from a user;
    extracting at least one keyword included in the voice instruction, comparing the at least one keyword with pre-stored keywords in a device;

identifying the application to perform an action corresponding to the voice instruction;

determining that the application is unavailable for the voice instruction of the user:

in response to determining that the application is unavailable for the voice instructions of the user, identifying a second device capable of executing the application;

transmitting the voice instruction to the second device;

receiving a result of executing the application from the second device; and providing, to the user, the result of executing the application as a response to the voice instruction.

2. The method of claim 1, wherein the user interaction comprises operating the application for an intended purpose of the user.

3. The method of claim 1, wherein the user interaction comprises at least one of non-voice user actions and voice instructions corresponding to the sequence for operating the application.

4. The method of claim 3, wherein the non-voice user actions comprise at least one of a touch input by the user and a gesture input by the user.

5. The method of claim 1, further comprising:

receiving a second voice instruction indicative of a request to access a second application;

detecting a course-of-action of the user to execute the second application when the second voice instruction is unrecognizable; and determining the course-of-action of the user as a preferred action for executing the second application upon subsequently receiving a similar voice instruction to the second voice instruction.

6. The method of claim 5, wherein the course-of-action comprises steps of providing manual inputs by the user to the device for executing the second application.

7. The method of claim 6, wherein the manual inputs comprises at least one touch input or at least one gesture input by the user.

8. The method of claim 1, wherein the extracting of the at least one keyword comprises extracting the at least one keyword based on a natural language processing (NPL) method.

9. An apparatus for supporting voice instructions, the apparatus comprising:

a memory configured to store a set of pre-stored keywords; and a processor configured to:

obtain a sequence for executing an application based on a user interaction, receive a voice instruction with respect to the application from a user, extract at least one keyword included in the voice instruction, compare the at least one keyword with the set of pre-stored keywords, identify the application to perform an action corresponding to the voice instruction, determine that the application is unavailable for the voice instruction of the user, in response to determining that the application is unavailable for the voice instructions of the user, identify a second device capable of executing the application, transmit the voice instruction to the second device, receive a result of executing the application from the second device, and provide, to the user, the result of executing the application as a response to the voice instruction.

10. The apparatus of claim 9, wherein the user interaction comprises at least one of non-voice user actions and voice instructions corresponding to the sequence for executing the application.

11. A non-transitory computer readable medium embodying a computer program for operating an electronic device including a memory and a processor, the computer program comprising computer readable instructions that, when executed by the processor, cause the electronic device to:

obtain a sequence for operating an application based on a user interaction;

receive a voice instruction with respect to the application from a user;

extract at least one keyword included in the voice instruction, compare the at least one keyword with pre-stored keywords in a device;

identify the application to perform an action corresponding to the voice instruction;

determine that the application is unavailable for the voice instruction of the user;

in response to determining that the application is unavailable for the voice instructions of the user, identify a second device capable of executing the application;

transmit the voice instruction to the second device;

receive a result of executing the application from the second device; and provide, to the user, the result of executing the application as a response to the voice instruction.

* * * * *